US012111010B2

(12) United States Patent
Christensen

(10) Patent No.: US 12,111,010 B2
(45) Date of Patent: Oct. 8, 2024

(54) DISPLAY STAND RISER THAT SUPPORTS DISPLAYS OF MULTIPLE WEIGHT CLASSES

(71) Applicant: Dell Products L.P., Round Rock, TX (US)

(72) Inventor: Steven Michael Christensen, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 164 days.

(21) Appl. No.: 17/481,343

(22) Filed: Sep. 22, 2021

(65) Prior Publication Data

US 2023/0090013 A1    Mar. 23, 2023

(51) Int. Cl.
*F16M 11/10* (2006.01)
*F16M 11/04* (2006.01)

(52) U.S. Cl.
CPC .......... *F16M 11/046* (2013.01); *F16M 11/10* (2013.01); *F16M 2200/047* (2013.01)

(58) Field of Classification Search
CPC ........ F16M 11/06; F16M 11/10; F16M 11/12; F16M 2200/04; F16M 2200/041
USPC ............ 248/133, 139, 140, 371, 372.1, 161, 248/162.1, 157, 576, 579, 590, 587, 630
See application file for complete search history.

(56) References Cited

U.S. PATENT DOCUMENTS

| | | | | |
|---|---|---|---|---|
| 7,967,273 B2* | 6/2011 | Zhou | ...................... | F16M 11/24 248/921 |
| 8,047,487 B2* | 11/2011 | Hwang | ................ | F16M 11/105 248/370 |
| 2012/0019990 A1* | 1/2012 | Segar | ..................... | F16M 11/24 361/679.01 |
| 2012/0193486 A1* | 8/2012 | Levin | ..................... | F16M 11/42 248/124.1 |
| 2013/0068916 A1* | 3/2013 | Mensing | ................ | F16M 11/18 248/122.1 |
| 2014/0020606 A1* | 1/2014 | Benden | .................. | A47B 97/00 108/50.14 |

* cited by examiner

*Primary Examiner* — Alfred J Wujciak
(74) *Attorney, Agent, or Firm* — Terrile, Cannatti & Chambers, LLP; Emmanuel A. Rivera

(57) ABSTRACT

Described are display riser, height adjustable stand (HAS) and a method to support lift and tilt of multiple weight classes of displays. A lift includes a primary spring and one or more boost springs. The primary spring is used for all displays supported by the HAS and the one or more boost springs are engaged when supporting displays requiring additional lift support. A pivot assembly includes a primary torsion spring and one or more boost torsion springs. The primary spring torsion is used for all displays supported by the HAS and the one or more boost torsion springs are engaged when supporting displays requiring additional tilt support.

1 Claim, 14 Drawing Sheets

DISPLAY STAND RISER THAT SUPPORTS DISPLAYS OF MULTIPLE WEIGHT CLASSES

BACKGROUND OF THE INVENTION

Field of the Invention

The present invention relates to the stands of displays. More specifically, embodiments of the invention provide for a height adjustable stand or display stand riser that supports displays of multiple weight classes.

Description of the Related Art

Stands that support displays, such as computer displays, monitors and all in one computers (collectively referred to as "displays"), can be implemented for use for a different sizes of displays. The range of the different sizes of displays varies depending on how a stand is configured. A stand can be height adjustable, referred to as a height adjustable stand or HAS. A HAS stand allows vertically travel to support different size displays and can allow a user to move the display into a desirable position, including portrait or landscape positions. A HAS stand can include a display riser that provides for vertical travel.

Freestanding HAS stands can have a base that rests on a working area. The base can be attached to a vertical support structure, which can be connected to a horizontal structure. The horizontal structure can be connected to a structure or assembly that attaches to a display. The structure or assembly that connects to the display can implement industry mounting standards, such as VESA (video electronics standards association) to connect with various displays.

Displays can come in different sizes and weights (i.e., weight classes). Typically, HAS stands with pivoting heads incorporate springs that offset the weight of the display allowing a user to manipulate the position of the display with minimal force. Because displays come in a variety of sizes and features, the display weights can vary from one to the other, therefore HAS stands are usually designed for a select range of display weight or weight classes. A HAS stand that supports a certain weight class, will not properly support other weight classes. If the wrong HAS stand is used, heavier displays may sag or drop to the lowest position. Lighter displays may spring up to the highest position. This is due to the spring(s) that provide opposing lifting forces of the HAS stand not matched correctly to the weight of the display.

Display and stand manufacturers may have to provide different stands and multiple stand part numbers to support different display weight classes. If a HAS or display riser can be developed to support a wider range of displays, then this can reduce non-recurring engineering (NRE) costs and logistical costs, as well as provide HAS stand options for product segments that currently cannot justify a unique part number.

SUMMARY OF THE INVENTION

A display riser of a height adjustable stand (HAS) comprising a lift assembly that includes a primary spring and one or more boost springs that provide opposing lift forces matched to the weight of the display, wherein the primary spring is used for all displays supported by the HAS and the one or more boost springs are engaged when supporting displays requiring additional lift support; and a pivot assembly that includes a primary spring and one or more boost springs that provide opposing pivot forces matched to the weight of the display, wherein the primary spring is used for all displays supported by the HAS and the one or more boost springs are engaged when supporting displays requiring additional tilt support.

A height adjustable stand (HAS) that supports multiple weight classes of displays comprising a display riser; a lift assembly integrated into the display riser, that includes a primary spring and one or more boost springs that provide opposing lift forces matched to the weight of the display, wherein the primary spring is used for all displays supported by the HAS and the one or more boost springs are engaged when supporting displays requiring additional lift support; and a pivot assembly integrated into the display riser that provide opposing pivot forces matched to the weight of the display, that includes a primary spring and one or more boost springs, wherein the primary spring is used for all displays supported by the HAS and the one or more boost springs are engaged when supporting displays requiring additional tilt.

A method of adjusting to a display weight for a height adjustable stand (HAS) comprising determining weight class of a display to be supported by the HAS; providing a primary spring for lift for all displays supported by the HAS; determining whether display needs one or more boost springs to provide lift support; engaging the one or more boost springs if it is determined that display needs the one or more boost springs to provide lift support; providing a primary spring for tilt for all displays supported by the HAS; determining whether display needs one or more boost springs to provide tilt support; and engaging the one or more boost springs if it is determined that display needs the one or more boost springs to provide tilt support.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Various implementations provide for a lift assembly that provides a primary spring and boost spring that provide opposing lift forces matched to the weight of the display to support vertical position of multiple weight classes of displays and a pivoting head assembly with a primary spring and boost spring that provide opposing pivot forces matched to the weight of the display to support tilt of multiple weight classes of displays. Implementations provide for the lift assembly and pivoting head assembly to be part of display riser of a height adjustable stand.

Figure 1:
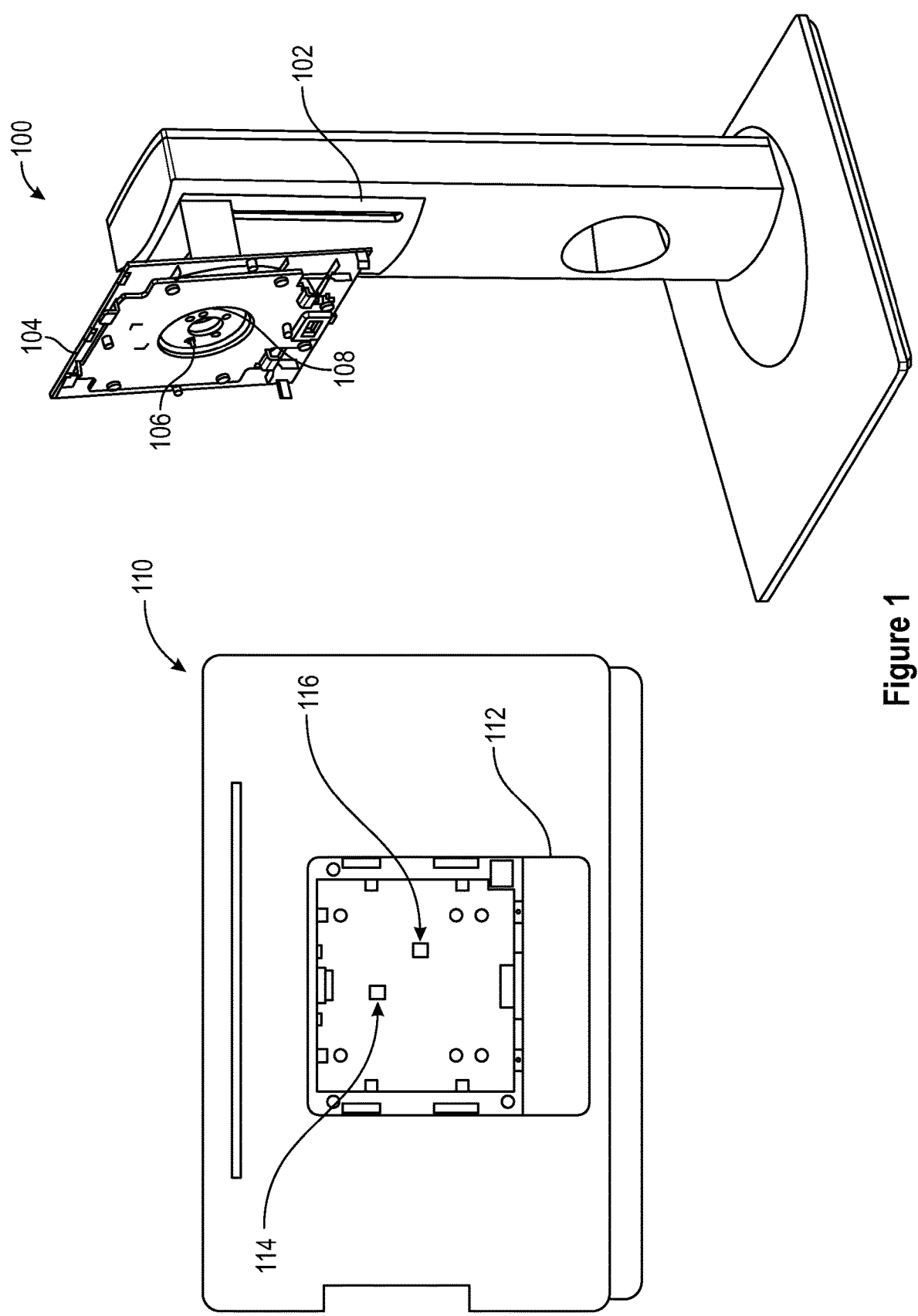
FIG. 1 illustrates a height adjustable stand that supports multiple weight classes of displays and a display.

FIG. 1 illustrates a height adjustable stand that supports multiple weight classes of displays and a display. In various embodiments, a height adjustable stand (HAS) 100 includes a display riser 102 that provides vertical travel. The HAS stand 100 and the display riser 102 are configured to support multiple weight classes of displays. The display riser 102 includes display mounting features (which could include VESA standard mounting features) 104. Implementations provide for the display (or VESA) mount 104 to include an actuator feature 106, such as a spring loaded plunger, that activates a boost spring for heavier classes of displays in providing lift, as further described herein. Implementations further provide for another actuator feature 108, that activates boost spring for heavier classes of displays in providing tilt, as further described herein.

A display 110, which includes computer monitors, all in one computers, and the like is attached to the HAS stand 100 by mounting features (e.g., VESA mount) 112 on the back of the display 110. As to display lift, the display mounting features 112 can include a keying feature 114. Implementations provide for the keying feature 114 to automatically activate the actuator feature 106, and particularly when heavier classes of displays 110 are attached to the HAS stand 100. For example, the keying feature 114 could either be a clearance hole, or boss, which engages actuator feature 106.

As to display tilt, the display mounting features 112 can include a keying feature 116. Implementations provide for the keying feature 116 to automatically activate the actuator feature 108, and particularly when heavier classes of displays 110 are attached to the HAS stand 100. For example, the keying feature 116 could either be a clearance hole, or boss, which engages actuator feature 108.

Figure 2:
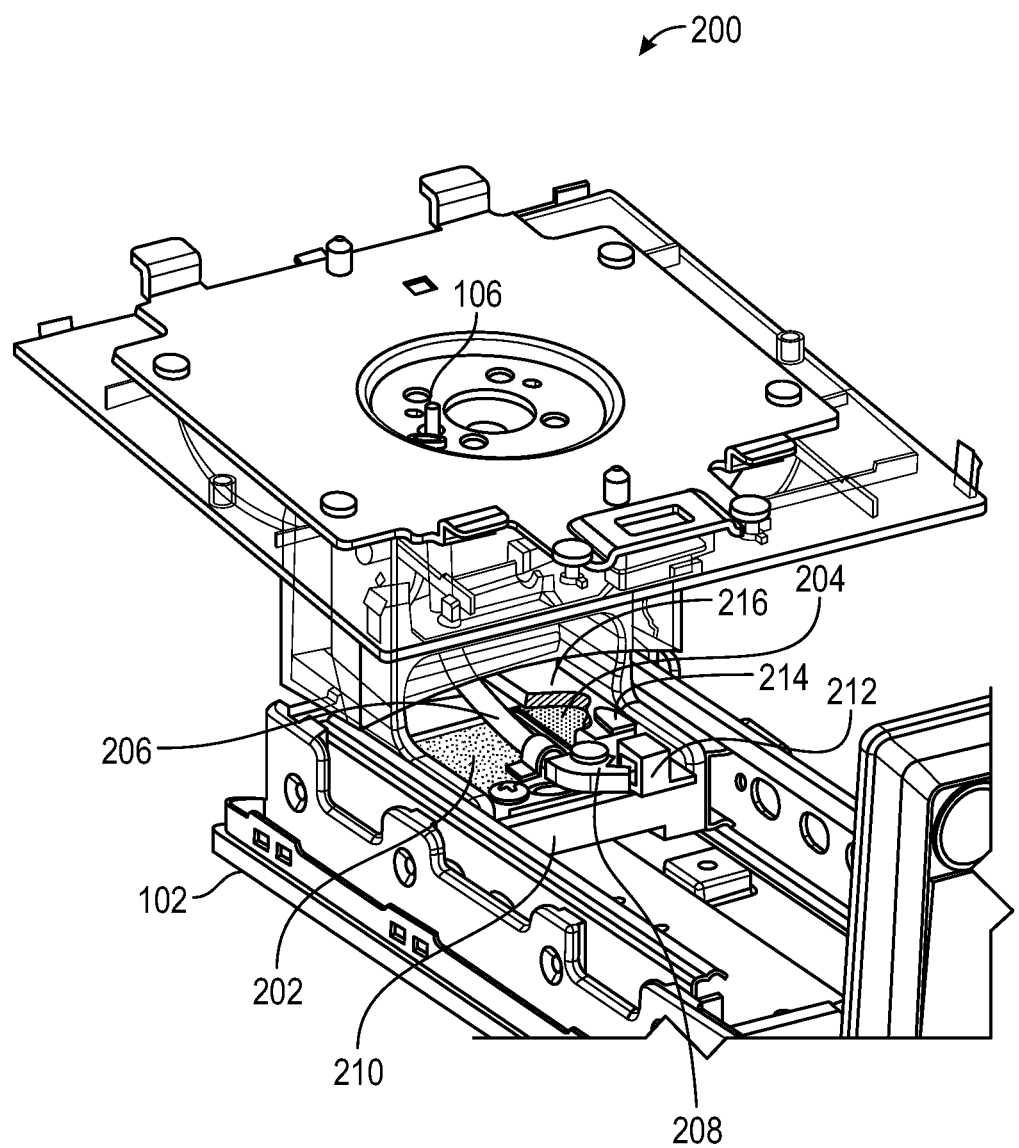
FIG. 2 illustrates a lift assembly with automatic spring force adjustment.

FIG. 2 shows a lift assembly with automatic spring force adjustment. Implementations provide for a lift assembly 200 to be part of display riser 102. The lift assembly 200 is configured to automatically adjust spring force for different weight classes of displays 110. Embodiments provide for a main or primary spring 202 and a secondary or boost spring 204. Although one boost spring 204 is described herein, it is to be understood that other embodiments can implement more than one boost spring 204. Implementations provide for springs 202 and 204 to be constant force springs.

As discussed, an actuator feature 106, can be provided. In certain implementations, the actuator feature 106 is a spring loaded plunger that is connected to a cable 206. The actuator feature 106 can be activated by the keying feature 114. The keying feature 114 could either be a clearance hole, or boss, which engages actuator the spring loaded plunger (i.e., actuator feature 106). When activated the actuator feature 106 (e.g., plunger) engages a pawl 208.

Implementations provide for a sliding riser assembly 210 which is moved due to the weight of the display 110. The primary bracket that holds the display 110 to directly attached to sliding riser assembly 210. When the display 110 is added, sliding riser assembly 210 pulls down on the primary spring 202 and/or primary spring 202 and boost spring 204.

Various implementations provide for a spring plate 212 for the boost spring 204, as well as spring plate with buckle 214 and buckle receiver 216. Spring plate 212, spring plate with buckle 214, and buckle receiver 216 are used to hold the boot spring 204 in a semi relaxed state ready for pawl engagement.

Figure 3:
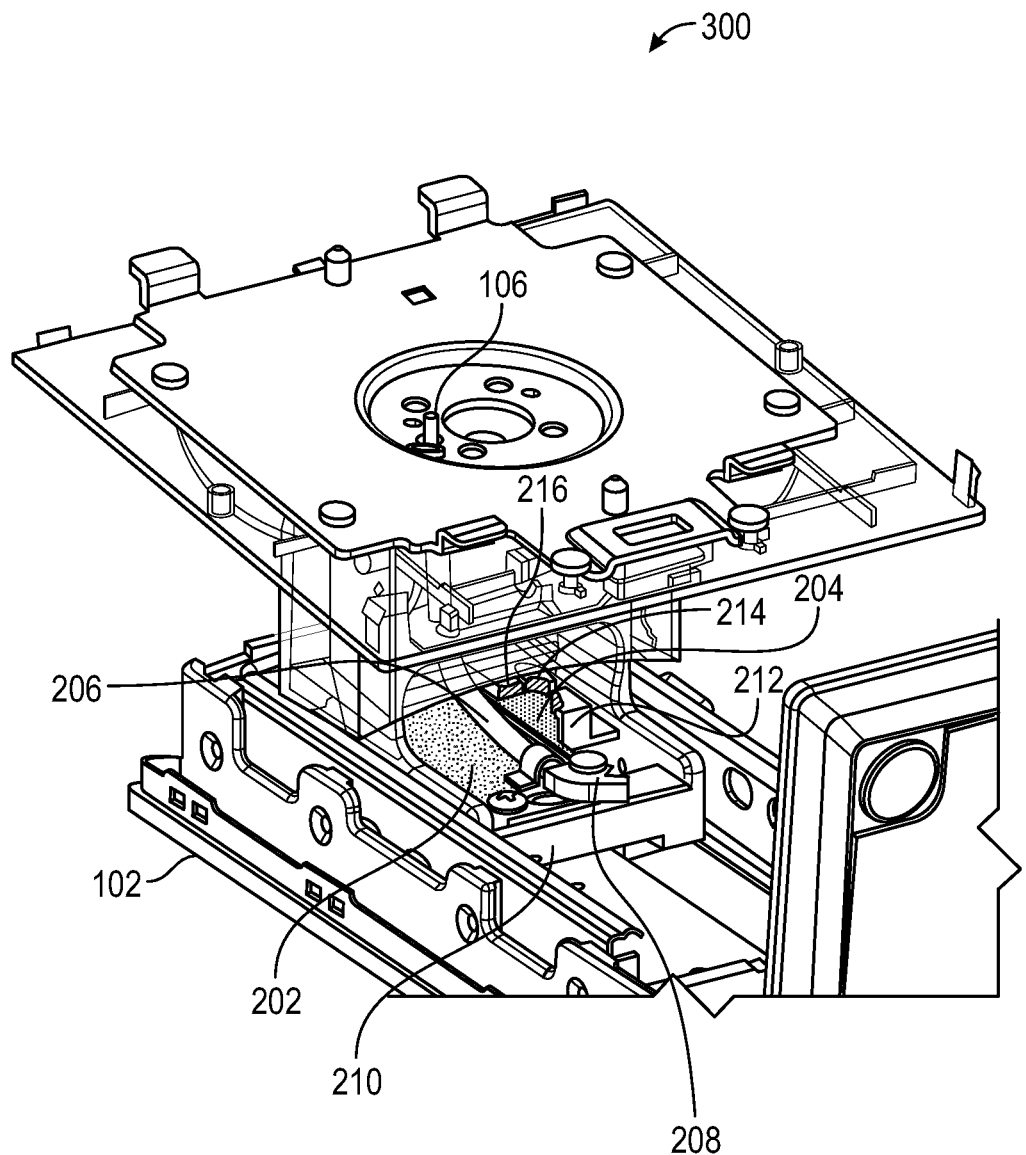
FIG. 3 illustrates a lift assembly with automatic spring force adjustment supporting a light display weight.

FIG. 3 shows a lift assembly 300 with automatic spring force adjustment supporting a light display weight. Weight classes are relatively defined. In the described, light displays are considered as displays that need only to be supported by the main or primary spring 202.

For lighter displays, the keying feature 114 is not provided on display 110. Therefore, the actuator feature 106 is not activated. The pawl 208 is not engaged. The boost spring 204 is disengaged from boost spring plate 212, spring plate with buckle 214, and buckle receiver 216. Therefore, only the main or primary spring 202 is engaged to the sliding riser assembly 210.

Figure 4:
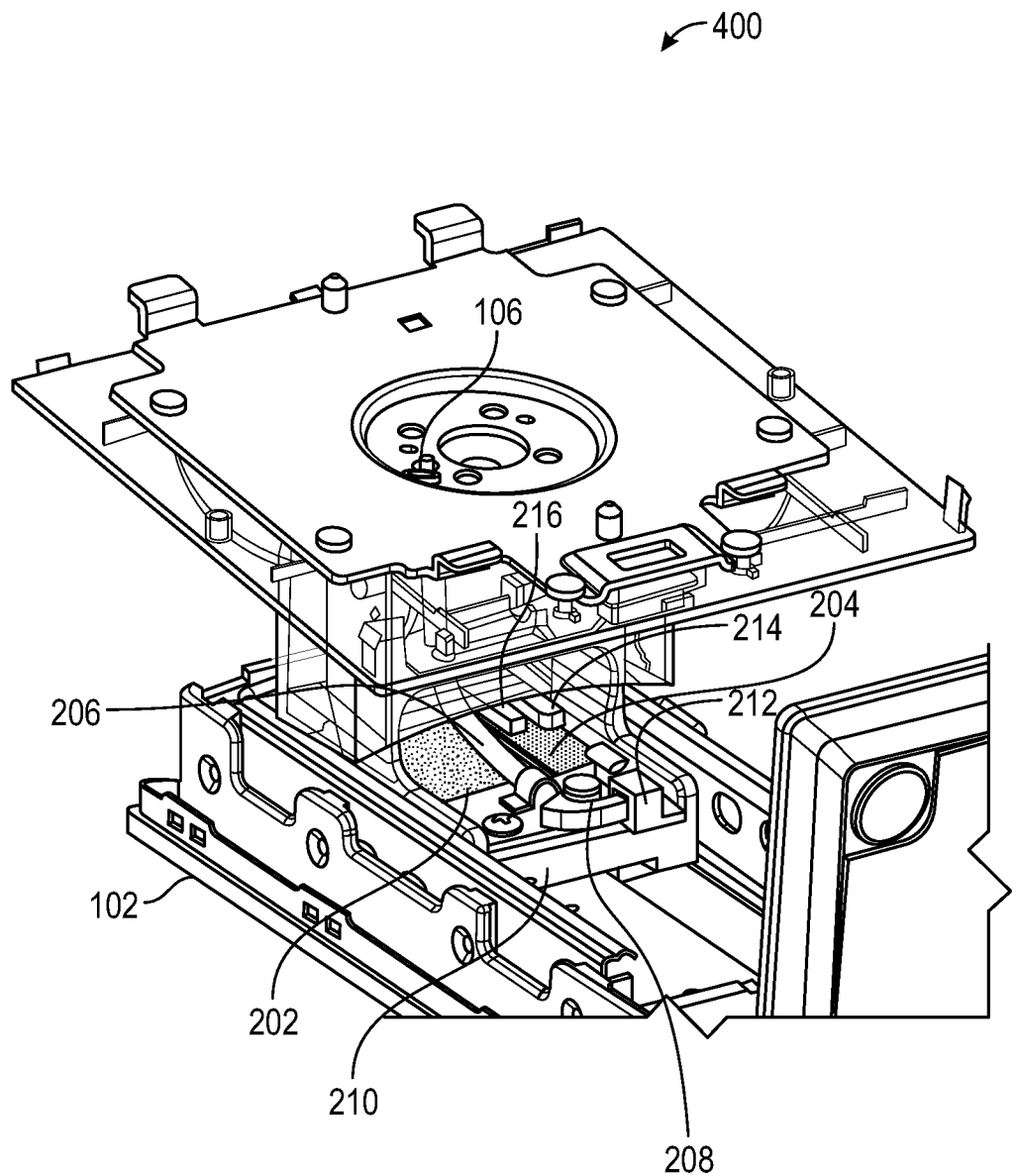
FIG. 4 illustrates a lift assembly with automatic spring force adjustment supporting a heavy display weight.

FIG. 4 shows a lift assembly 400 with automatic spring force adjustment supporting a heavy display weight. As discussed, heavy displays are considered as displays that need the support of both the primary spring 202 and the boost spring 204.

For heavy displays, the keying feature 114 is provided on display 110. Therefore, the actuator feature 106 can be activated by the keying feature 114. The pawl 208 is engaged. The pawl 208 engages the boost spring plate 212, and spring plate with buckle 214 and buckle receiver 216 are disengaged, allowing the boost spring 204 to provide additional counteracting spring force to the weight of the heavier display. Therefore, the main or primary spring 202 and boost spring are engaged to the sliding riser assembly 210.

Figure 5:
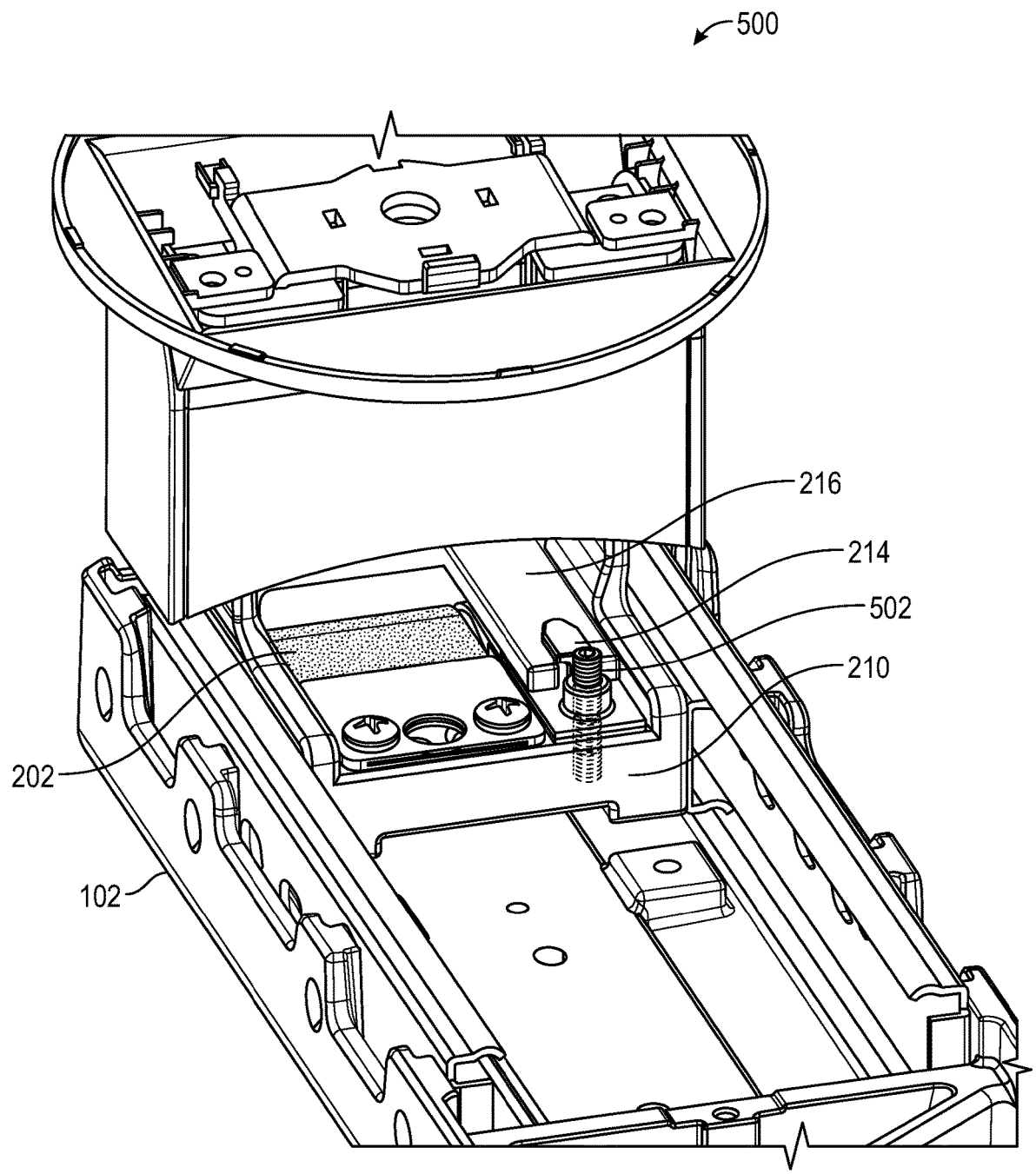
FIG. 5 illustrates a lift assembly with manual spring force adjustment.

FIG. 5 shows a lift assembly 500 with manual spring force adjustment. In certain implementations, the display 110 is not configured a keying feature 114. In certain instances, it may be desirable to manually engage or disengage the one or more boost springs 204. In such implementations with manual spring force adjustment, the primary spring 202 is always engaged, while the one or more boost springs are engaged or disengaged depending on the weight of the display 110.

In such implementations, a boost spring screw 502 can be adjusted for different displays weight classes. For heavy displays, the boost spring screw 502 is turned to lock 214 to 210, thereby engaging the boost spring 204. For light displays, the boost spring screw 502 is turned to disengage the boost spring 204. It is to be understood, that other locking mechanisms, such as a button or latch, can be used other than boost spring screw 502.

Figure 6:
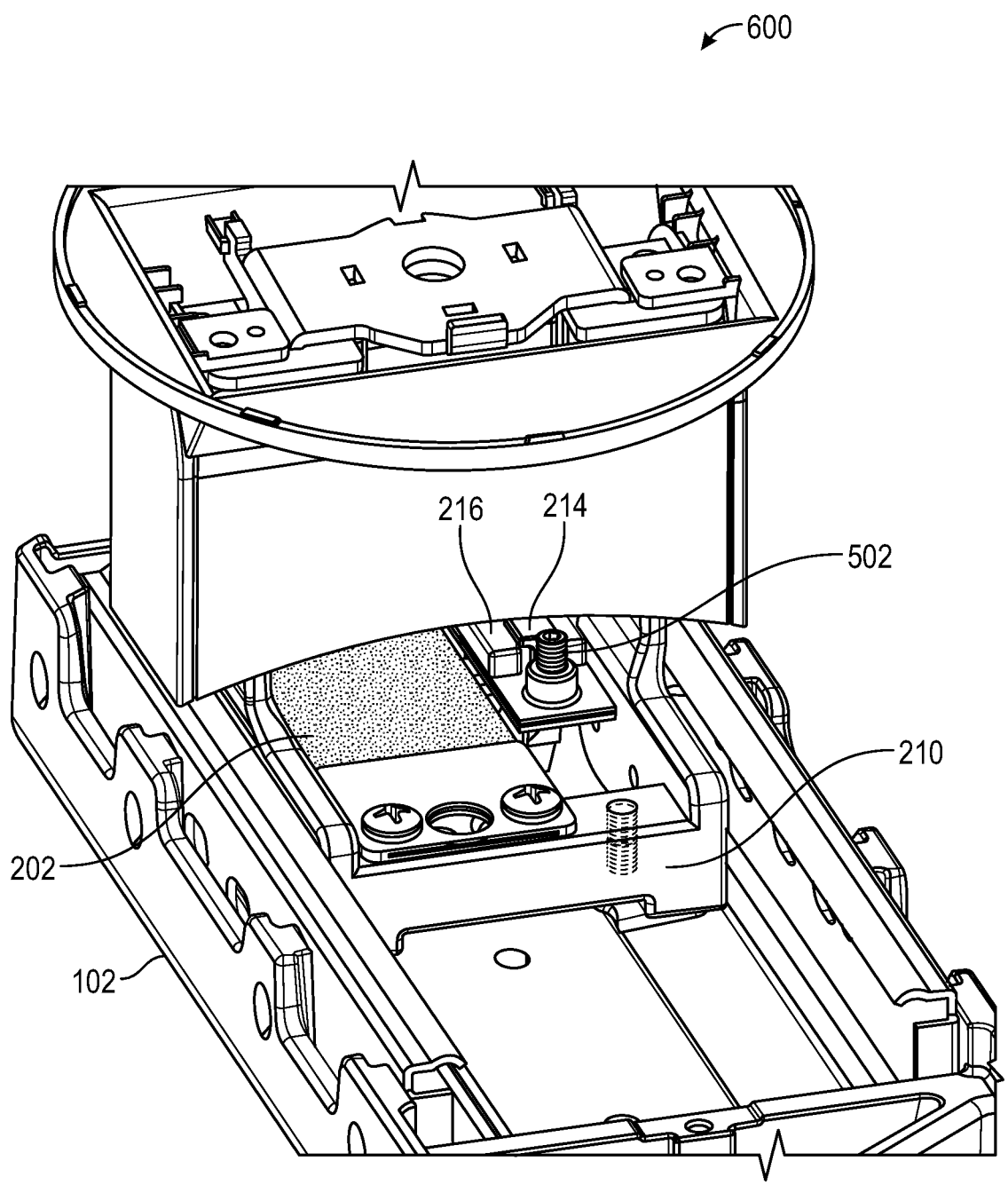
FIG. 6 illustrates a lift assembly with manual spring force adjustment supporting a light display weight.

FIG. 6 shows a lift assembly 600 with manual spring force adjustment supporting a light display weight. As discussed, light weight displays are considered displays that only need the main or primary spring 202. In such implementations, the boost spring screw 502 is turned to disengage from 210, thereby disengaging the boost spring 204 as 210 is moved. Only the main or primary spring 202 is engaged to the sliding riser assembly 210.

Figure 7:
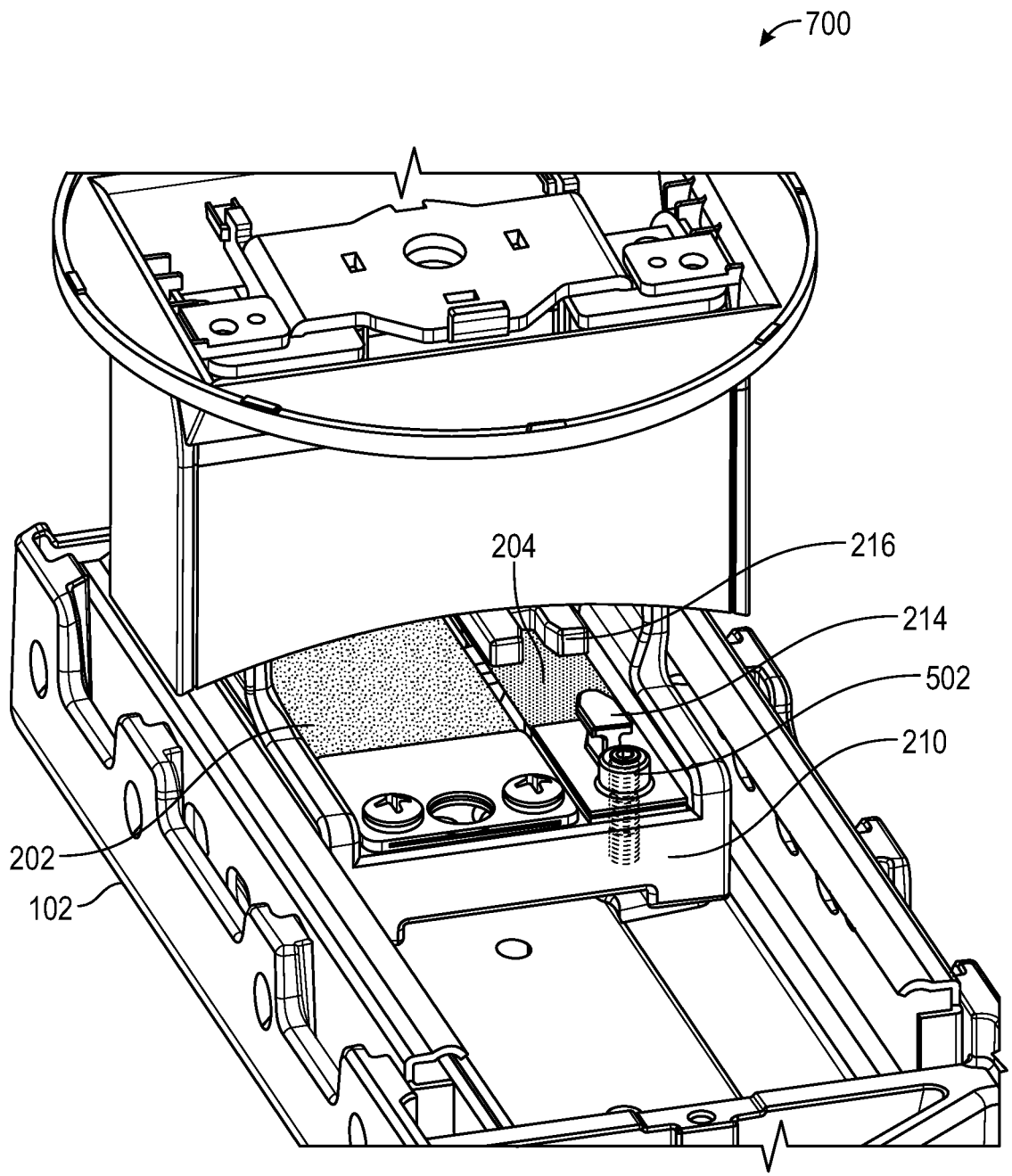
FIG. 7 illustrates a lift assembly with manual spring force adjustment supporting a heavy display weight.

FIG. 7 shows a lift assembly 700 with manual spring force adjustment supporting a heavy display weight. As discussed, heavy weight displays are considered displays that need the main or primary spring 202 and boost spring 204. In such implementations, the boost spring screw 502 is turned to lock 214 to 210, thereby engaging the boost spring 204. The main or primary spring 202 and boost spring are both engaged to the sliding riser assembly 210, thereby both contributing to the counterbalance of the display weight.

Figure 8A:
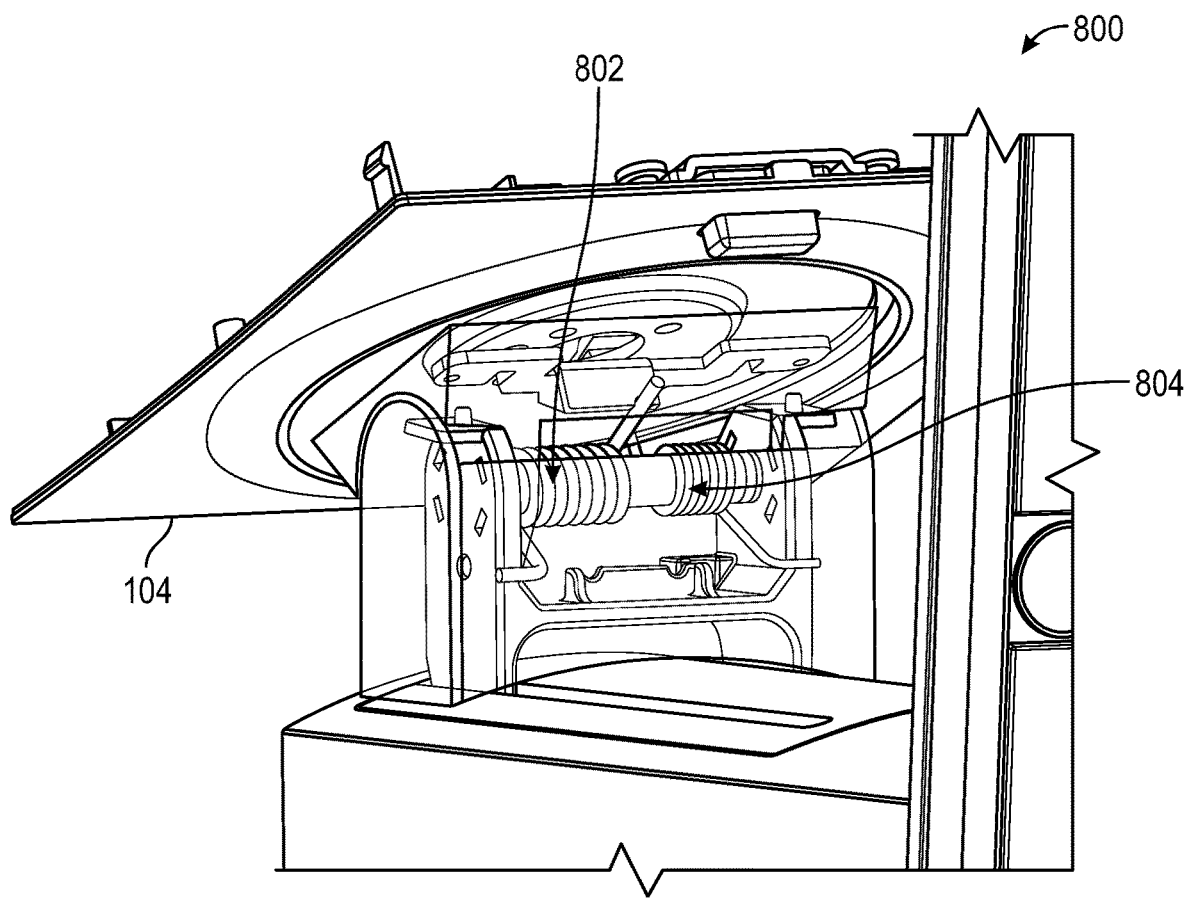
FIG. 8A illustrates a rear view of a pivot assembly with automatic spring force adjustment.

FIG. 8A shows a rear view of a pivot assembly 800 with automatic spring force adjustment. In various embodiments, the pivot assembly 800 is part of the display riser 102. Display tilt is directed to angular tilt of display 110 when attached to the HAS stand 100. Relatively lighter displays do not require as much offsetting tilt force as do relatively heavier displays. Implementations provide for the pivot assembly 800 to include a primary spring 802 and a boost spring 804. In this embodiment, the primary and boost springs are both torsion spring types.

Implementations provide for primary torsion spring 802 to be a higher spring force than the boost torsion spring 804. Although a boost torsion spring 804 is described herein, it is to be understood that other embodiments can implement more than boost torsion springs 804. Implementations provide for springs 802 and 804 to be extension, compression, constant force, or other types of springs.

Figure 8B:
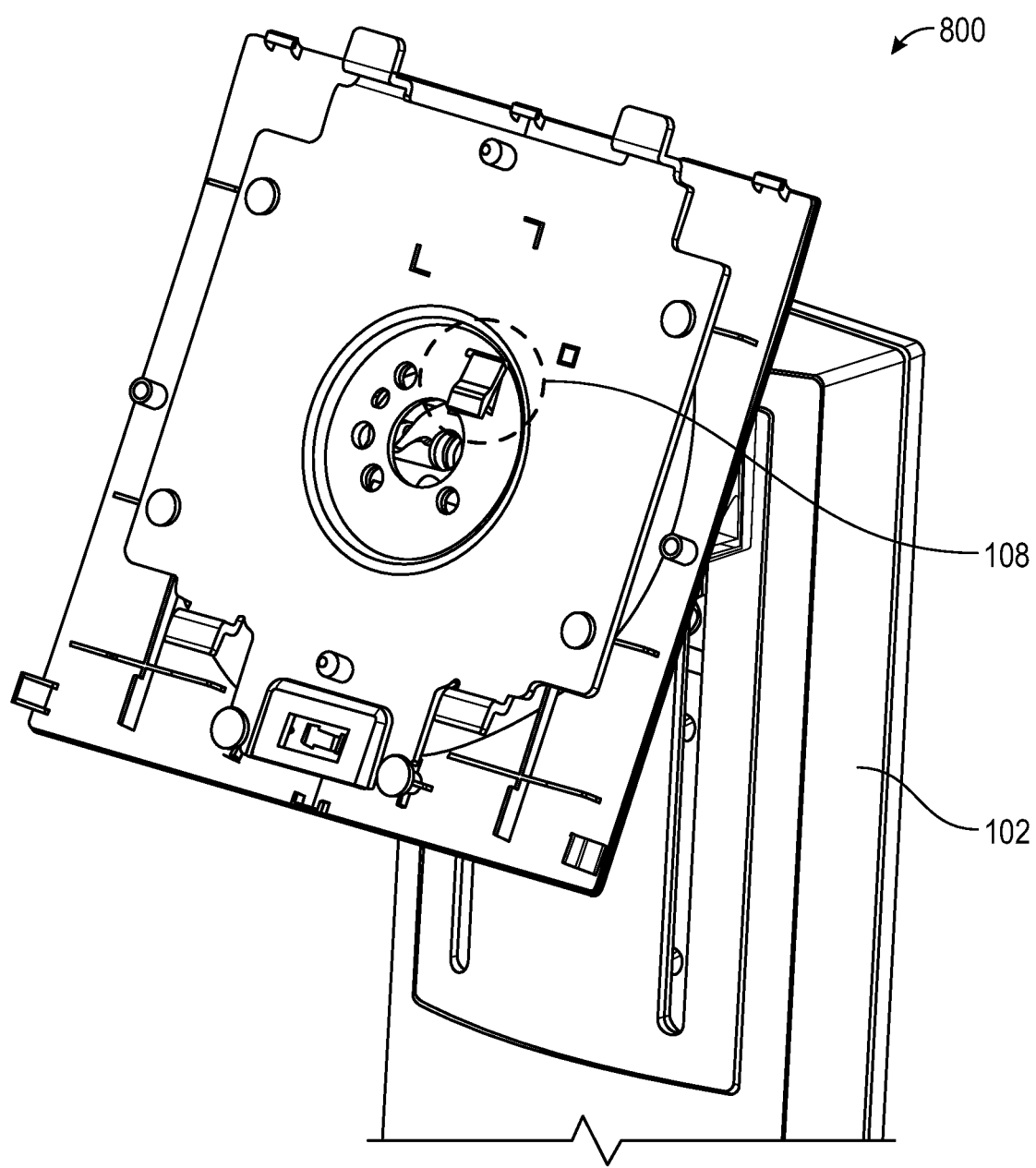
FIG. 8B illustrates front view of a pivot assembly with automatic spring force adjustment.

FIG. 8B shows a front view of a pivot assembly 800 with automatic spring force adjustment. Implementations provide for the primary spring 802 to be engaged for all weights of displays. The boost spring 804 is engaged for heavier displays. Implementations provide for automatic engagement of the boost spring 804 through actuator feature 108. In certain embodiments, the actuator feature 108 pivots, and is normally open, held by a small spring.

As discussed, the display mount 112 can include the keying feature 116. Implementations provide for the keying feature 116 to automatically activate the actuator feature 108, and particularly when heavier classes of displays 110 are implemented. For example, the keying feature 116 can either be a clearance hole, or boss, which engages actuator feature 108.

Figure 9:
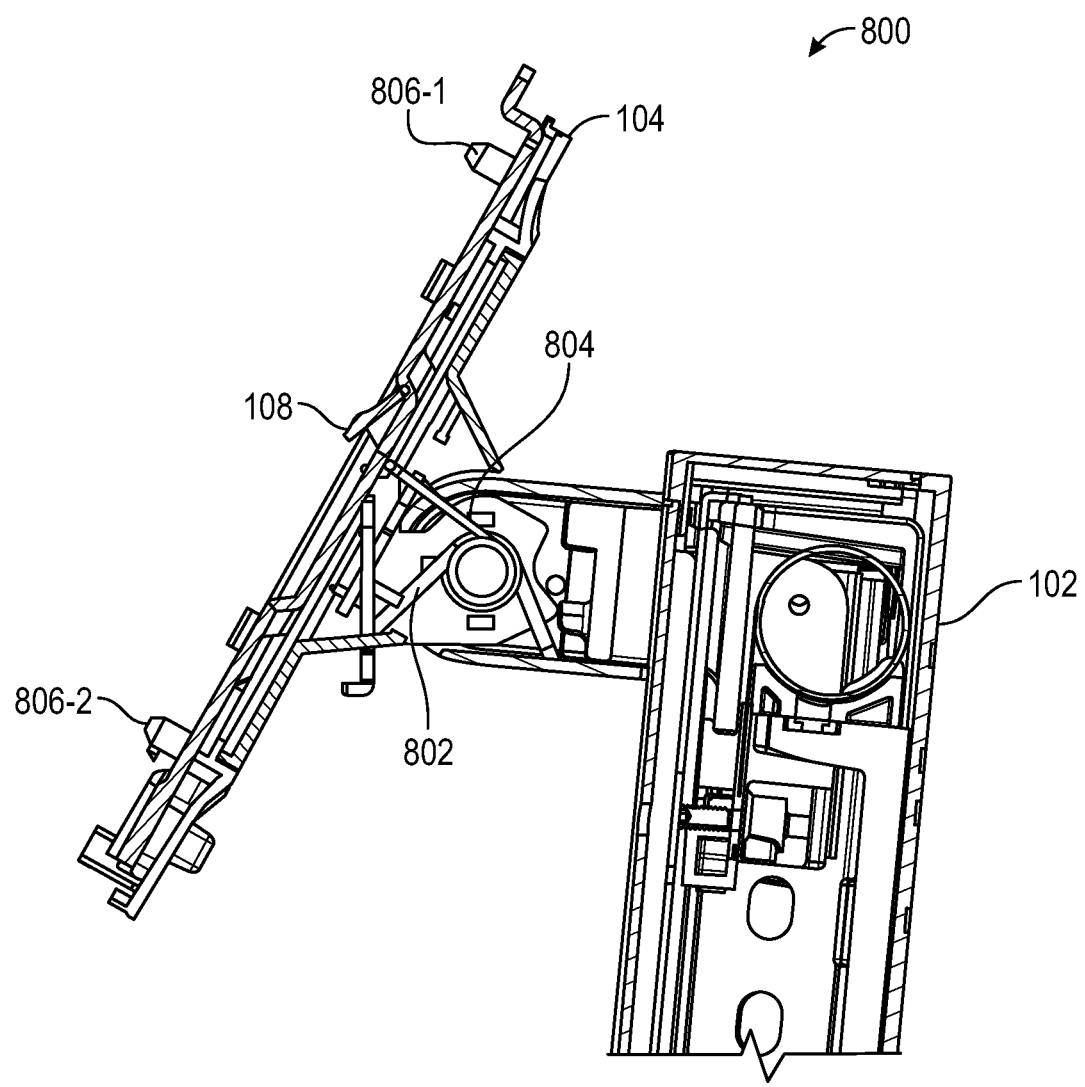
FIG. 9 illustrates a side view of a pivot assembly with automatic spring force adjustment.

FIG. 9 shows a side view of a pivot assembly 800 with automatic spring force adjustment. The torsion spring 802 to be engaged for all weights of displays. The boost spring 804 is engaged for a heavier display, when actuator feature 108 is depressed. Implementations provide for guides 806 on display mount 104.

Figure 10:
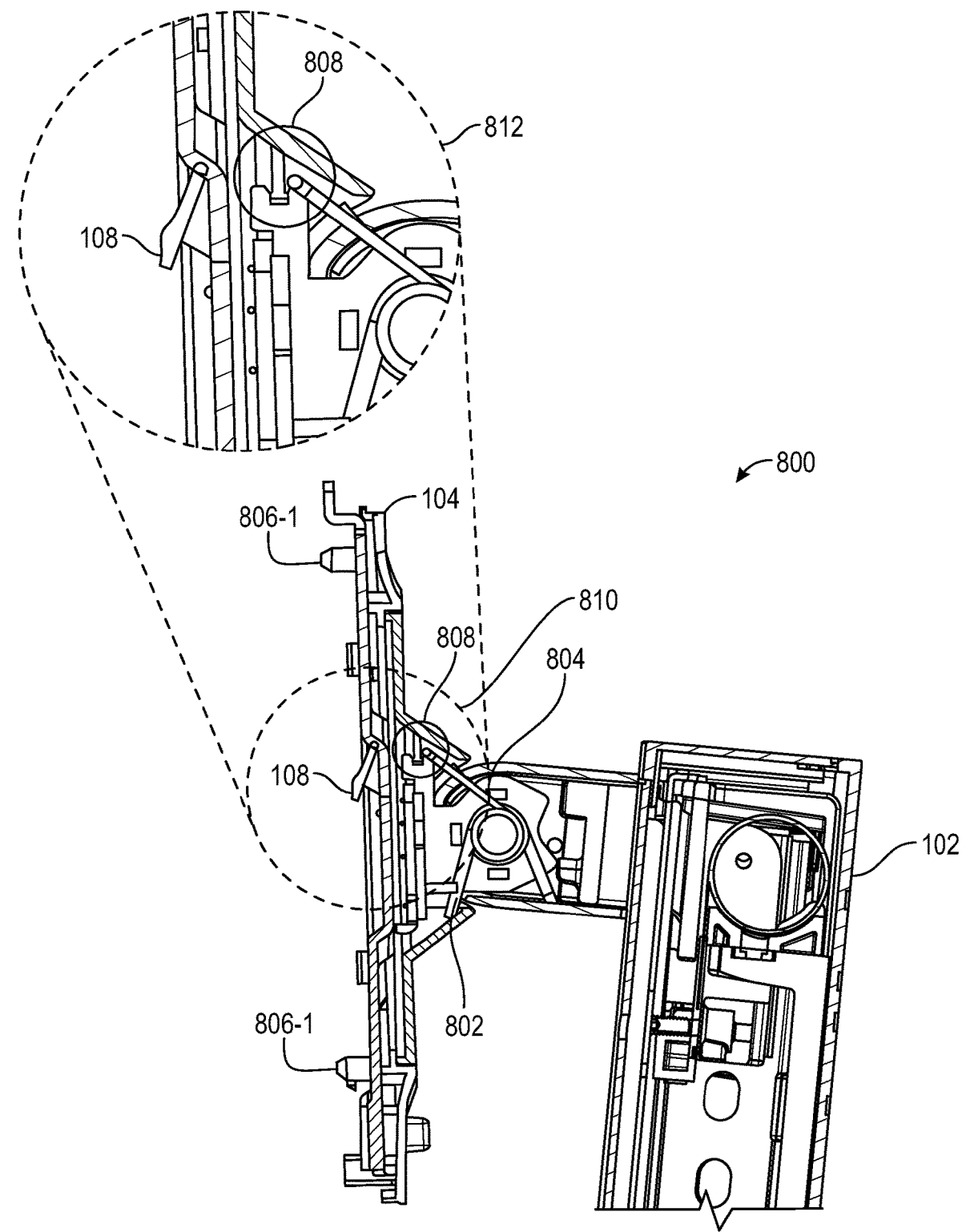
FIG. 10 illustrates a side view of a pivot assembly with automatic spring force adjustment supporting a light display weight.

FIG. 10 shows a side view of a pivot assembly 800 with automatic spring force adjustment supporting a light display weight. As discussed, weight classes are relatively defined. For display tilt, light displays are considered as displays that need only to be supported by primary spring 802. The actuator feature 108 is not depressed, and boost spring 804 is not engaged as shown in 808. 810 is shown enlarged in 812.

Figure 11:
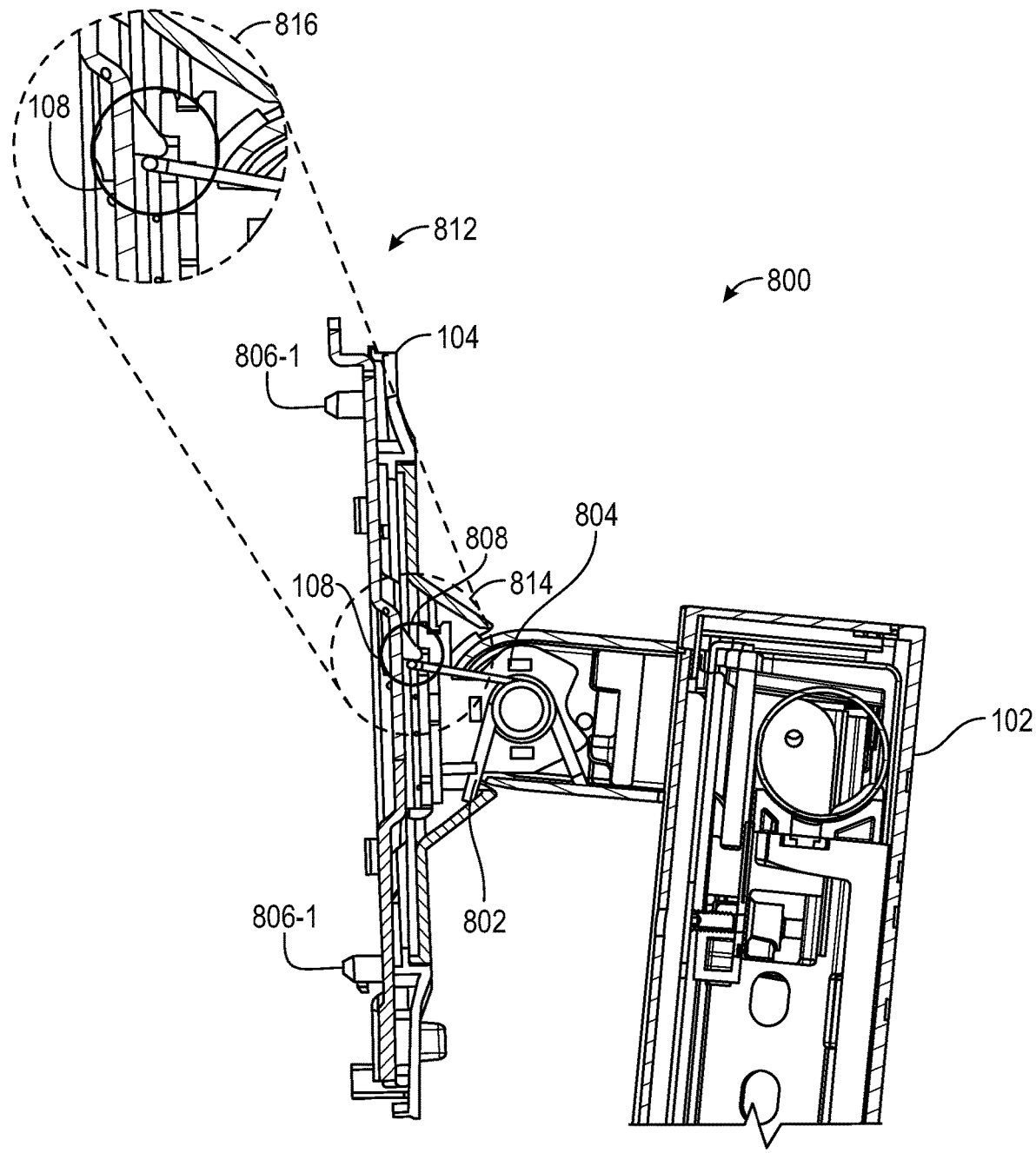
FIG. 11 illustrates a side view of a pivot assembly with automatic spring force adjustment supporting a heavy display weight.

FIG. 11 shows a side view of a pivot assembly 800 with automatic spring force adjustment supporting a heavy display weight. As discussed, weight classes are relatively defined. For display tilt, heavy displays are considered as displays that need to be supported by primary spring 802 and boost spring 804. The actuator feature 108 is depressed, such as when keying feature 116 depresses against the actuator feature. The boost spring 804 is engaged as shown in 808. 812 is shown enlarged in 814.

Figure 12:
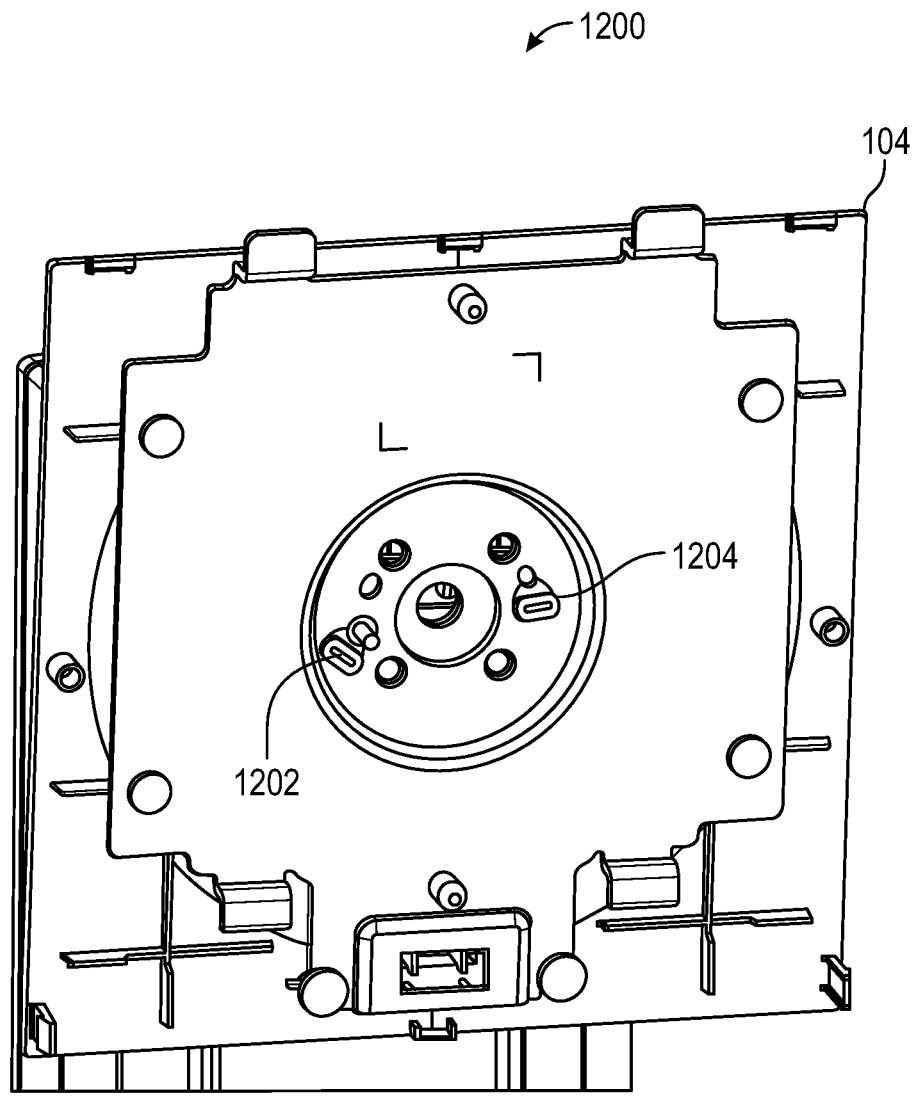
FIG. 12 illustrates a pivot assembly with manual override of automatic spring force adjustment.

FIG. 12 shows a pivot assembly 1200 with manual override of automatic spring force adjustment. In certain use cases, it may be desirable to manually engage or disengage the boost spring 204 for display lift. A manual override mechanical lever 1202 is provided to engage or disengage the actuator feature 106. Likewise, it may be desirable to manually engage or disengage the boost spring 804 for display tilt. A manual override mechanical lever 1204 is provided to engage or disengage the actuator feature 108.

Figure 13:
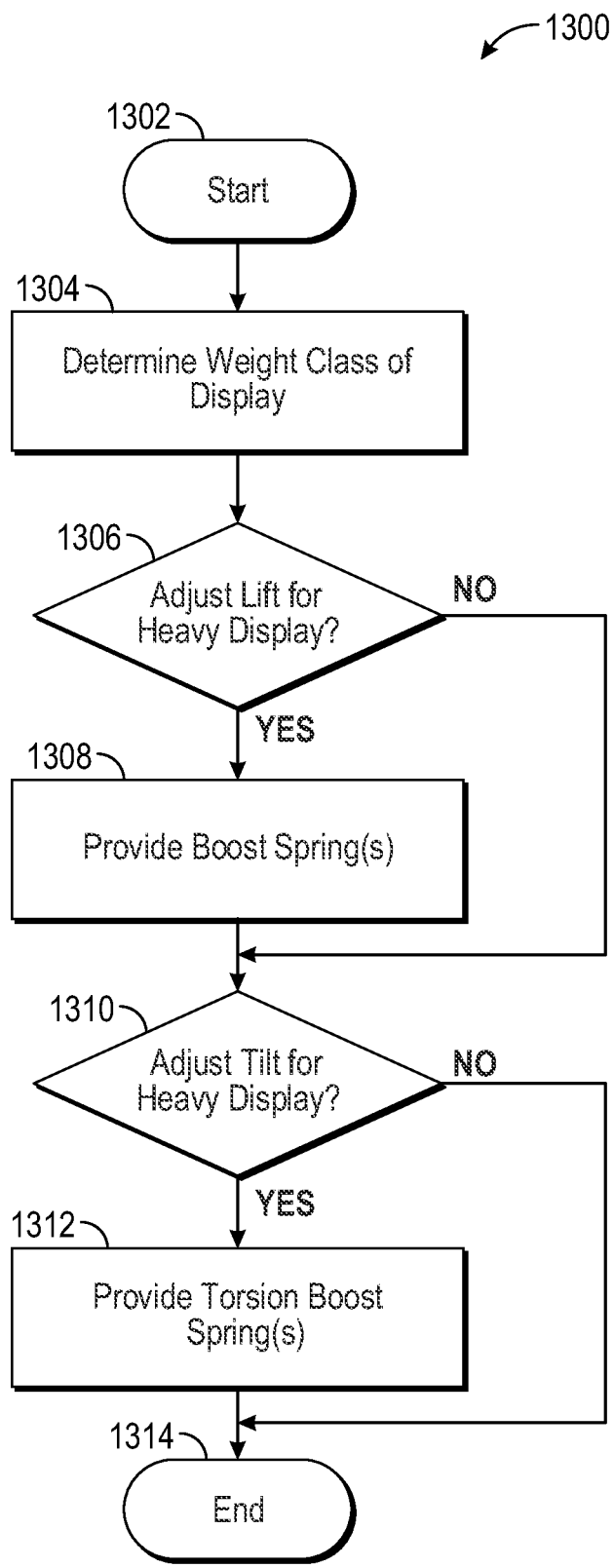
FIG. 13 is a generalized flowchart for adjusting to a display weight for a display riser of a height adjustable stand.

FIG. 13 is a generalized flowchart for adjusting to a display weight for a display riser of a height adjustable stand. The order in which the method is described is not intended to be construed as a limitation, and any number of the described method blocks may be combined in any order to implement the method, or alternate method.

At step 1302, the process 1300 starts. At step 1304, a determination is performed as to a weight class of a display 110, such as a computer monitor, all in one computer and the like. The display 110 is to be attached to HAS stand 100, and particularly to display riser 102.

If the display 110 is to be adjusted for lift for a heavy display, following the YES branch of step 1306, step 1308 is performed. As discussed, weight classes are relatively defined. In the described, heavy displays are considered as displays need to be supported by main or primary spring 202 and one or more boost springs 204. At step 1308, the one or more boost springs 204 are provided or activated. The boost spring(s) 204 can be automatically activated, such as with an actuator feature 106 and keying feature 114. In certain instances, the boost spring(s) 204 are set manually.

If the display 110 is not to be adjusted for lift a heavy display, following the NO branch of step 1306, step 1310 is performed. In such cases, the display 110 may be considered as a light display and only main or primary spring 202 is needed. In certain instances, the boost spring(s) 204 are disengaged manually.

If the display 110 is to be adjusted for tilt for a heavy display, following the YES branch of step 1310, step 1312 is performed. As discussed, weight classes are relatively defined. In the described, heavy displays are considered as displays need to be supported by primary spring 802 and one or more boost springs 804. At step 1312, the one or more boost springs 804 are provided or activated. The boost spring(s) 204 can be automatically activated, such as with an actuator feature 108 and keying feature 116.

If the display 110 is not to be adjusted for tilt for a heavy display, following the NO branch of step 1310, step 1314 is performed. At step 1314, process ends. In such cases, the display 110 may be considered as a light display and only the primary spring 802 is needed. In certain instances, the one or more boost springs 804 are disengaged manually.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only and are not exhaustive of the scope of the invention.

Consequently, the invention is intended to be limited only by the spirit and scope of the appended claims, giving full cognizance to equivalents in all respects.

What is claimed is:

1. A stand supporting a variety weight of displays comprising:

A display riser mounted in the stand wherein the display riser comprises a primary spring and at least one boost spring, the primary spring provides a counterbalance force when supporting a light weight display on the stand and the at least one boost spring provides additional counterbalance force along with the primary spring for supporting a heavy weight display on the stand; and a lift assembly slidably mounted on the display riser for adjusting the height of the display; the lift assembly further comprises a display mounting feature for supporting the display; the display mounting feature includes an actuator wherein the actuator is connected to the lift assembly to unlock or lock the lift assembly from sliding with respect to the display riser, the lift assembly further comprises a tilting support for tilting the angle of display; and Wherein the heavy weight display comprises a keying feature for engaging or disengaging the actuator when the display is mounted on the display mounting feature and wherein the light weight display does not include the keying feature; and Wherein the actuator is a spring loaded plunger and the keying feature is one of a clearance hole or a boss.

* * * * *